United States Patent [19]

Kawamura et al.

[11] 4,253,735
[45] Mar. 3, 1981

[54] IMAGE FORMING OPTICAL SYSTEM FOR SEMICONDUCTOR LASER

[75] Inventors: Naoto Kawamura, Inagi; Koichi Masegi; Isao Hakamada, both of Yokohama, all of Japan

[73] Assignee: Canon Kabushiki Kaisha, Tokyo, Japan

[21] Appl. No.: 33,255

[22] Filed: Apr. 25, 1979

[30] Foreign Application Priority Data

Apr. 28, 1978 [JP] Japan .................. 53/51844

[51] Int. Cl.³ .............................................. G02B 3/00
[52] U.S. Cl. .................................. 350/409; 350/6.5; 350/433; 362/259; 331/94.5 H
[58] Field of Search ................ 350/175 R, 6.5–6.91, 350/190; 362/259

[56] References Cited

U.S. PATENT DOCUMENTS

| 3,407,294 | 10/1968 | Hill | 362/259 |
| 3,805,347 | 4/1974 | Collins et al. | 350/175 R |
| 4,185,891 | 1/1980 | Kaestner | 362/259 |

Primary Examiner—Conrad J. Clark
Attorney, Agent, or Firm—Fitzpatrick, Cella, Harper & Scinto

[57] ABSTRACT

An image forming optical system for a semiconductor laser which forms an image of a semiconductor laser as a light source through an image forming lens, wherein the image forming lens is so disposed that it maintains the original divergent point of the semiconductor laser in the vertical direction and the image forming plane in a conjugative relationship, and that the image forming magnification $\beta$ in the vertical direction satisfies the following relationship of $\beta = \gamma \cdot \sin \theta_O \cdot F_{eff} \, (1.2 \leq \gamma \leq 3.0)$ based on an angle $\theta_O$, at which the intensity of orientation characteristic in the vertical direction assumes $1/e^2$ at the center and an effective F-number $F_{eff}$ at the image side.

4 Claims, 11 Drawing Figures

IMAGE FORMING OPTICAL SYSTEM FOR SEMICONDUCTOR LASER

BACKGROUND OF THE INVENTION

This invention relates to an optical system for various apparatuses and measuring instruments with a semiconductor laser as the light source, the characteristic feature of which resides in providing the most favorable optical system without necessity for correcting, by any optical system, an astigmatic difference (hereinafter simply called "As") which arises unavoidably when the semiconductor laser is used as the light source.

In general, projecting light beams from a semiconductor laser are governed by a direction, in which their divergent angles orthogonally intersect. Also, the original point of divergence differs depending on the above-mentioned orthogonally intersecting direction. This is ascribable to the internal construction of the semiconductor laser per se, and to the fact that a region of the light emitting portion does not take a circular form as in the gas laser, but a rectangular form.

FIGS. 1A and 1B show a state of divergence of a beam from a semiconductor laser, wherein FIG. 1A is a top plan view of the semiconductor laser, and FIG. 1B is a side elevational view thereof. In the drawing, a reference numeral 1 designates a semiconductor laser chip, and a numeral 2 refers to a junction surface thereof. A numeral 4 refers to the original divergent point of the light beam in a direction parallel to this junction surface (hereinafter referred to as "horizontal direction"), while a numeral 5 refers to the original divergent point of the beam in a direction vertical to the junction surface (hereinafter referred to as "vertical direction"). The original divergent point 4 in the horizontal direction is positioned off the beam projecting surface, while the original divergent point 5 in the vertical direction is positioned in the vicinity of the beam projecting surface.

When a focussed spot of the projecting light from the semiconductor laser having such As is formed by use of an ordinary lens (an anamorphic lens system including a cylindrical lens may serve the purpose; this designates any ordinary lens which requires no correction of As), the focussed spot does not form a beam waist on the image focussing plane in the cross-section thereof in both vertical and horizontal directions.

FIGS. 2A, 2B and 2C explain the above situation, in which FIG. 2A is a top plan view, and FIG. 2B is a side elevational view. In more detail, when a light beam from the semiconductor laser is focussed by means of a lens 6, the shape of the focussed spot changes by varying the image forming plane. FIG. 2C shows in (I), (II), (III) and (IV) the changes in the shape of every focussed spot when the image forming plane is varied, from which it is seen that the beam waist in the horizontal direction exists in the position of (II) and the beam waist in the vertical direction is present at the position of (IV).

As one example of correcting this difference in position of the beam waist in both vertical and horizontal directions, laid-open Japanese patent application No. 52-24542 discloses that the original divergent points in the orthogonally intersecting directions are caused to meet each other by use of cylindrical lenses, each having a different radius of curvature and the generatrices of which orthogonally intersect mutually.

Such method of correcting the original point of beam diversion with an optical system (which will be called "correction of As") is capable of regularizing the beam waist position on the image forming plane, and of forming as small a focussed spot as possible. This is the requisite condition even in the case of using the focussed beam spot in an interference experiment by simple collimation, but not intending to obtain such small focussed spot.

The correction of As, however, is extremely difficult to accomplish, since the optical system should be adjusted very precisely. In other words, in order to converge a light beam having different original divergent points in the two mutually orthogonally intersecting directions at one specific point, the same adjustment of the optical system must be done twice with respect to each of these orthogonally intersecting two directions, which is very troublesome and time-taking. Moreover, there is no assurance that such adjustment can be successfully done independently for each direction. There might possibly take place such a situation that, when one of the two directions is adjusted, the other gets out of order. Consequently, for the successful adjustment of the optical system, skills of veteran technicians are indispensable.

Furthermore, the quantity of such As is not constant, but it differs from a semiconductor laser to the other. Not to say of the laser having different structures, even the lasers of identical structure possess varying quantity of As depending on their production lot. Accordingly, correction of such As with an optical system necessitates use of a differing optical system for each of the semiconductor lasers, or provision of an adjusting mechanism with the consequence that burden would increase on the part of the optical system to be used, which reflects on the operational cost and complexity in such adjusting operation. Further, even with the same kind of laser, there occurs such a situation that the quantity of As varies depending on current value.

On the other hand, when the semiconductor laser is used for image recording, display, and so forth, there is no necessity for regularizing the original divergent points of light beam, unlike the case of using the light beam for an interference test. This is only a problem relative to the shape and peak power. Therefore, if the required specifications are satisfied when the image recording and display are performed, the correction of As becomes unnecessary.

SUMMARY OF THE INVENTION

It is therefore an object of the present invention to provide an optimum optical system with any optical system which does not necessitate correction of As, using a semiconductor laser. The optimum system as herein referred to is one, in which various factors such as, for example, focal length, F-number, etc. of the optical system are determined in conformity to the characteristic properties of the laser, and in which these factors are set in such a way that the peak power of the focussed spot may become maximum. In more detail, in case a focussed spot of the semiconductor laser as the light source is formed on an image forming plane by an image forming lens, the F-number, the focal length, etc. of the image forming lens are properly selected in conformity to the characteristic properties of the semiconductor laser, and the magnification of the optical system is established in conformity to the characteristic properties of the laser, whereby the peak power of the image focussing spot can be made maximum.

In the optical system of the present invention, the light beam of the semiconductor laser which diverges in the vertical direction and the light beam which diverges in the horizontal direction are focussed by a horizontal magnification which has been set independently in the respective directions.

According to the present invention, in one aspect thereof, there is provided an optical system for a semiconductor laser which comprises: a semiconductor laser having different positions for the original divergent point of the light beam in the direction of the junction surface and the original divergent point of the light beam in the direction vertical to the junction surface; a scanning surface which receives a light beam from the semiconductor laser; and an image forming optical system interposed between the semiconductor laser and the scanning surface, maintaining a conjugative relationship between the original divergent point of the light beam in the direction vertical to the junction surface of the semiconductor laser and the scanning surface, and having a lateral magnification $\beta$ in the direction vertical to the junction surface which satisfies the following equation:

$$1.2 \sin \theta_o \cdot \text{Feff} \leq \beta \leq 3 \cdot \sin \theta_o \text{ Feff}$$

where $\theta_o$ is an angle, at which the intensity of the orientation characteristic of the light beam from the laser in the direction vertical to the junction surface assumes $1/e^2$; Feff is an effective F-number at the side of the image boundary of the image forming optical system in the direction vertical to the junction surface.

According to the present invention, in another aspect thereof, there is provided an optical system for a semiconductor laser, in which the lateral magnification $\beta'$ in the direction parallel to the junction surface of the image forming optical system satisfies the following equation:

$$\beta' = \frac{\gamma \cdot \sin\theta_o' \cdot F'eff}{\sqrt[4]{1 + \frac{K^2}{4} \sin^4\theta_o' \cdot As^2}}$$

$$1.2 \leq \gamma \leq 3$$

where $\theta_o'$ is an angle, at which the intensity of the orientation characteristic of the light beam from the laser in the direction vertical to the junction surface assumes $1/e^2$; F'eff is an effective F-number at the side of the image boundary of the image forming optical system in the direction of the junction surface of the semiconductor laser; As is an interval between the original divergent point of the light beam in the direction perpendicular to the junction surface of the semiconductor laser and the original divergent point of the light beam in the direction parallel to the junction surface; and $K = 2\pi/\lambda$, where $\lambda$ is a wavelength.

DESCRIPTION OF PREFERRED EMBODIMENTS

In the following the optimum optical system according to the present invention will be described in detail.

Figure 3:
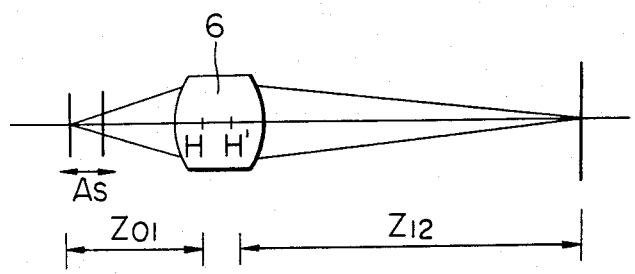
FIGS. 3 and 4 are schematic diagrams for explaining the principle of the present invention.

Now assume that the optical system is as shown in FIG. 3, and that a distance from the original point of light emission from a semiconductor laser to a front main point H of a lens 6 is $Z_{01}$ and a distance from the rear main point to the beam waist at the image forming side is $Z_{12}$.

If an amplitude distribution of the laser at the original point of light emission is $U_0(x_0, y_0)$ (since this is a beam waist, there is no phase difference), an amplitude distribution of the laser on an incidence pupil plane of the lens can be denoted as follows.

$$U_1(x_1, y_1) = \frac{e^{ikz_{01}}}{i\lambda z_{01}} \cdot e^{ik\frac{x_1^2+y_1^2}{2z_{01}}}$$

$$U_0(x_0, y_0)e^{-ik\frac{(x_1x_0+y_1y_0)}{z_{01}}} dx_0 dy_0$$

where: $k=(2\pi)/\lambda$, $x_1$, $y_1$ represent coordinate on the incidence pupil plane, and the integration is carried out on the light source plane.

For the purpose of discussion hereinafter, the above equation is rewritten as follows by degrading for one order.

$$U_1(x_1) = \sqrt{\frac{e^{ikz_{01}}}{i\lambda z_{01}}} \cdot e^{ik\frac{x_1^2}{2z_{01}}} \int_{x_0} \quad (1)$$

$$U_0(x_0)e^{-ik\frac{x_1x_0}{z_{01}}} dx_0$$

The reason for this rewriting is that, when the light emission section of the semiconductor laser is rectangular in its structure, and the two orthogonally intersecting directions are taken in the x and y directions for the variable separation, the amplitude distribution can be independently handled with respect to these two orthogonally intersecting directions.

Using this amplitude distribution $U_1(x_1)$, when a focussed spot is formed on the image forming plane (a plane at a distance of $Z_{12}$) through the lens 6, the amplitude distribution $U_2(x_2)$ on the image forming plane is represented by the following equation (2):

$$U_2(x_2) = \sqrt{\frac{e^{ikz_{12}}}{i\lambda z_{12}}} \cdot e^{ik\frac{x_2^2}{2z_{12}}} \int_{-\infty}^{\infty} R(x_1)U_1(x_1)e^{-ik\frac{x_1^2}{2f}} e^{ik\frac{(x_2-x_1)^2}{2z_{12}dx_1}} = \quad (2)$$

$$\sqrt{\frac{e^{ikz_{12}}}{i\lambda z_{12}} \cdot \frac{e^{ikz_{01}}}{i\lambda z_{01}}} e^{ik\frac{x_2^2}{2z_{12}}} \int\int_{-\infty}^{\infty} R(x_1)U_0(x_0)e^{ik\frac{x_1^2}{2}(\frac{1}{z_{01}}+\frac{1}{z_{12}}-\frac{1}{f})} \times$$
$$e^{-ik\frac{x_1 x_0}{z_{01}}} \times e^{-ik\frac{x_1 x_2}{z_{12}}} dx_0 dx_1$$

where: f is a focal length of the lens 6, and $R(x_1)$ is a pupil function of the lens 6.

Now, if the following relationship is present:

$$R(x_1) = \begin{cases} 0 & \text{for } |x_1| \geq a \\ 1 & |x_1| < a \end{cases} \text{ and}$$

$$\frac{1}{z_{01}} + \frac{1}{z_{12}} - \frac{1}{f} \equiv \xi$$

the following relationship can be readily derived on $\epsilon$ and As.

$$\xi \approx -\frac{As}{z_{01}^2} \quad (3).$$

Figure 1A:
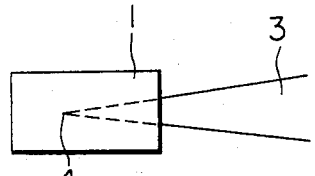
FIGS. 1A and 1B are schematic diagrams for explaining the light emission characteristics of a semiconductor laser.
Figure 1B:
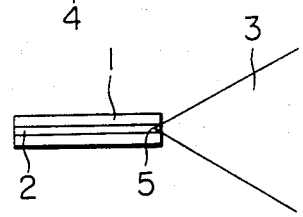
Figure 2A:
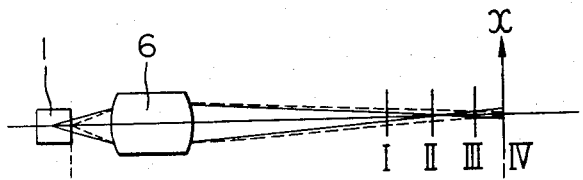
FIGS. 2A, 2B, and 2C respectively show a state, wherein the light beam from the semiconductor laser is focussed through an image forming lens.
Figure 2B:
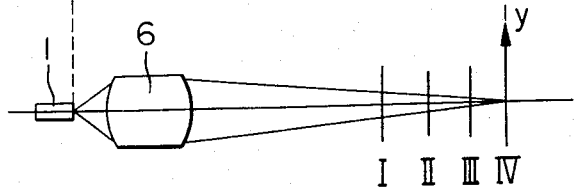
Figure 2C:
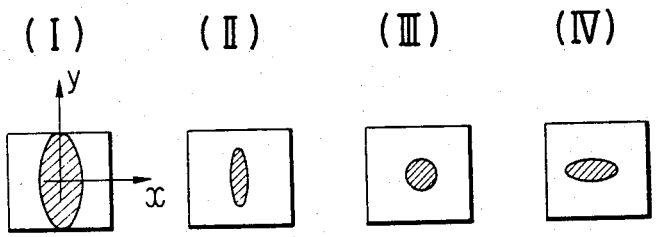

By performing numerical computation using the above equations (2) and (3), there can be established such an optical system that maximizes the center intensity of the focussed spot on any arbitrary plane (i.e., on the plane as shown by (I), (II), (III) and (IV) in FIG. 2C).

Now further assume that, from the equation (2), the optimum optical system, in which the center intensity of the focussed spot in the horizontal direction (x direction), when the image forming plane is brought to a position of the beam waist in the vertical direction (y direction), becomes maximum without the optical system not having performed the correction of As. In this instance, the focussed spot on the image forming plane in the horizontal direction does not form the beam visit, but is in a slightly defocussed state.

In order to find out the optimum optical system in such a state, each of the constants (such as focal length, F-number, etc.) of the optical system may be varied as parameter, on the basis of which the numerical computation of the equation (2) is performed to observe variations in the center intensity. According to the present invention, however, the optimum system can be found out analytically by rewriting the equation (2) to an approximate equation of a degree which causes substantially no problem in the actual use.

For the above-described purpose, the amplitude distribution $U_0(x_0)$ of the original light emission point will first be described in the form of its far field pattern, as follows.

$$BS(x_1) \equiv \sqrt{\frac{e^{ikz_{01}}}{i\lambda Z_{01}}} \int_{-\infty}^{\infty} U_0(x_0)e^{-ik\frac{x_1 x_0}{z_{01}}} dx_0 \quad (4)$$

where: $Bs(x_2)$ denotes the amplitude distribution of the lens on the incidence pupil plane.

Such conversion as above is based on the fact that measurement of the original light emission point $U_0(x_0)$ is generally very difficult, since it is usually in an order of a few μm, hence precision in the measured result is poor, and that, due to undesirable influence of diffraction in the measuring system, finding of a true value is difficult, hence, when it is converted to the far field pattern, the measurement becomes easy with satisfactory precision, and errors in measurement are less due to the measurement being conducted without intermediary of an optical system. For such reason, the equation (2) is rewritten as follows.

$$U_2(x_2) = \sqrt{\frac{e^{ikz_{12}}}{i\lambda z_{12}}} e^{ik\frac{x_2^2}{2z_{12}}} \int_{-\infty}^{\infty} R(x_1)BS(x_1)e^{ik\frac{x_1^2}{2}\xi} \times \quad (5)$$
$$e^{ik\frac{x_1 x_2}{z_{12}}} dx_1$$

Now assume that the light source mode is the basic mode of $TEM_{00}$ the equation (4) can be generally expressed as follows with the Gaussian distribution.

$$BS(x_1) = \frac{const}{\sqrt{w_{1x}}} e^{-\frac{x^2}{w_{1x}^2}} \quad (4')$$

where: BS is an abbreviation for beam spread, and $w_{1x}$ denotes an expansion of a distance where intensity drops to $1/e^2$. By substituting the equation (4') for the equation (5), the equation (2) can be finally expressed as follows, using a quantity $BS(x_2)$ which is easy to measure.

$$U_2(x_2) = const \int_{-\infty}^{\infty} R(x_1)e^{-\frac{x_1^2}{w_{1x}^2} + ik\frac{\xi x_1^2}{2}} \cdot e^{-ik\frac{x_1 x_2}{z_{12}}} dx_1 \quad (6)$$

Hereinbelow, it will be tried to develop R(x) with a Hermite-Gaussian function.

$$R(x_1) = \sum_n Bn \, \Phi n(x_1) \quad (7)$$

$$\text{provided } \Phi n(x_1) = \frac{Nn}{\sqrt{wa}} Hn(\sqrt{2}\frac{x}{wa}) e^{-\frac{x_1^2}{wa^2}}$$

$$Nn = (\sqrt{\frac{2}{\pi}} \cdot \frac{1}{2^n n!})^{\frac{1}{2}}$$

$Hn(\epsilon)$ is a Hermite function of an n order such as, for example:
$H_0(\epsilon) = 1$
$H_1(\epsilon) = 2\epsilon$
$H_2(\epsilon) = 4\epsilon^2 - 2$
$H_3(\epsilon) = 8\epsilon^3 - 12\epsilon$ The development coefficient Bn when it is developed with $\phi n(x_1)$ (which constitutes an orthogonal function) can be found out from the following equation.

$$Bn = \int_{-\infty}^{\infty} R(x_1) \Phi n(x_1)dx_1 = \int_{-a}^{a} \Phi n(x_1)dx_1$$

According to the calculation done by the present inventor, Bn can be represented as follows, from which it has been discovered that Bn can be set in such a manner that most of the power may be concentrated on $B_0$.

$B_0 = 0.9428$ $B_1 = 0$
$B_2 = -2.51 \times 10^{-4}$
$B_3 = 0$

In other words, such fact signifies that, when $R(x_1)$ is developed with the orthogonal function of $\phi n(x_1)$ as in the equation (7), fairly high precision can be resulted by taking only the term $n=0$ of the development. In this case, the equation (6) can be expressed as follows.

$$U_2(x_2) \approx const \int_{-\infty}^{\infty} B_0 N_0 e^{\frac{x_1^2}{wa^2} - \frac{x_1^2}{w_{1x}^2} + ik\frac{\xi x_1^2}{2} - ik\frac{x_1 x_2}{z_{12}}} dx_1$$

From the above, the integration can be solved analytically, as follows.

$$U_1(x_2) = \tag{8}$$

$$const \cdot B_0 N_0 \sqrt{\frac{\sqrt{K}}{1+K-is}} e^{-\frac{x_2^2}{w_{2x}^2} - \frac{isx_2^2}{(1+K)w_{2x}^2} + \frac{ikx_2}{2z_{12}}}$$

where: $K = \frac{w_{1x}^2}{w a^2} = 0.9702 \frac{w_{1x}^2}{a^2}$ \quad (8')

$$S = \frac{k\epsilon}{2} w_{1x}^2 = \frac{k}{2} \sin^2\theta_0 \cdot As$$

Figure 4:
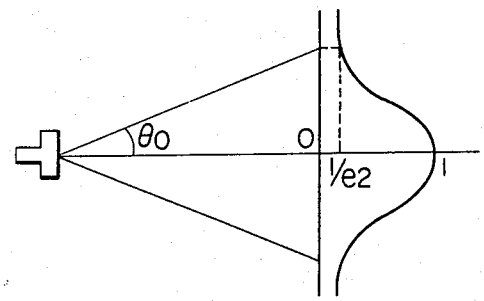

In the above equations, $\theta_o$ is an angle, at which the intensity distribution of the laser beam falls on its maximum value of $1/e^2$ when the laser beam is irradiated onto a flat plane (vide: FIG. 4).

$$w_{2x} = \frac{\lambda z_{12}}{\pi w_{1x}} \sqrt{1+K} \cdot \sqrt{1 + \frac{S^2}{(1+K)^2}}$$

Here, the peak power $I(x_2=0) \equiv I_0$ can be represented as follows.

$$I_0 = const \sqrt{\frac{K}{(1+K)^2 + S^2}} \tag{9}$$

Next, a condition, in which the value of $I_o$ in the equation (9) is made maximum, is found out. From $$\left. \frac{\delta I_o}{\delta K} \right|_{a, \theta_0 = constant} = 0,$$

the following significant relationship is obtained.

$$K^2 = 1 + S^2 \tag{10}$$

In other words, by setting the optical system to satisfy the equation (10), the value of $I_o$ can be made maximum on the image forming plane. Here, the equation (10) is converted to various quantities of the optical system, for which purpose the magnification $\beta$ of the optical system is found with K, as follows.

$$\beta = -\frac{z_{12}}{z_{01}} = -\frac{1}{\frac{z_{01}}{f} - 1}, \tag{11}$$

From $z_{01}\sin\theta_0 = \omega_{1x}$ $$\therefore \beta = -\frac{1}{\frac{\omega_{1x}}{f\sin\theta_0} - 1} = -\frac{1}{\frac{\sqrt{K}}{\gamma \sin\theta_0 \cdot F} - 1}$$

where: $F = (f/2a)$, F denotes f-number, and $\gamma$ is a constant of $\gamma \approx 2$.

Therefore, by substituting $\beta$ for the equation (8'), the following equation can be found.

$$\beta = -\frac{1}{\left(\frac{4\sqrt{1 + \frac{K^2}{4} \sin^4\theta_0 \cdot As^2}}{\gamma \cdot \sin\theta_0 \cdot F}\right) - 1} \tag{12}$$

The significance of the equation (12) is that, when the orientation intensity distribution of the projecting light beam from the semiconductor laser is given and the quantity of As is known, the magnification $\beta$ of the optical system to be obtained from the equation (12) can be determined, if the peak power of the focussed spot is to be made maximum by the use of the optical system which does not perform correction of As.

Here, the equation (12) is modified to be described in terms of the effective F-number Feff, as follows.

$$\left(Feff = \frac{z_{12}}{2a}\right) \tag{12'}$$

$$\beta = \gamma \cdot \frac{9}{\sqrt{K}} \cdot \sin\theta_0 \cdot Feff$$

$$= \frac{\gamma \cdot \sin\theta_0 \cdot Feff}{4\sqrt{1 + \frac{K^2}{4} \sin^4\theta_0 \cdot As^2}}$$

In the following, concrete explanations will be given by applying the abovementioned matters to a practical optical system.

Figure 5:
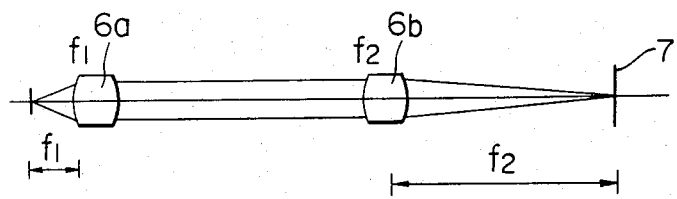
FIG. 5 is also a schematic diagram for explaining, in more concrete manner, the principle of the present invention.

FIG. 5 illustrates one embodiment of such optical system which consists of a light collecting lens 6a and an image forming lens 6b, and in which the light emitting end face of the semiconductor laser is substantially on the front focal plane $f_1$ of the light collecting lens 6a and the image forming plane is on the rear focal position $f_2$ of the image forming lens 6b.

Accordingly, the projecting beam from the semiconductor laser in the vertical direction is focussed on the image forming plane 7 as a substantial beam waist, since the original divergent point of beam is in the vicinity of the light emitting end face. On the other hand, the projecting light beam in the horizontal direction is focussed on the image forming plane 7 not in the form of the beam waist, because the original divergent point is at a position away from the end face and no As correction is made on the lens system. In such system, the equation 12' is represented as follows:

$$\beta = \frac{\gamma \cdot \sin\theta_0 \cdot F_2}{4\sqrt{1 + \frac{K^2}{4} \sin^4\theta_0 \cdot As^2}} \tag{12''}$$

where $\beta$ is a magnification of a conjugative plane between the laser end face and the recording surface; As denotes a distance as measured from the end face of the original point of the beam divergence in the horizontal direction (since the original point of the beam divergence in the vertical direction is substantially on the end face); $F_2$ is an F-number of the image forming lens; and $\gamma$ is a constant showing a value of $\gamma \approx 2$. Accordingly, the values of $f_1$ and $f_2$ in this optical system may be so determined that the magnification will be found from the equation (12'').

Figure 6:
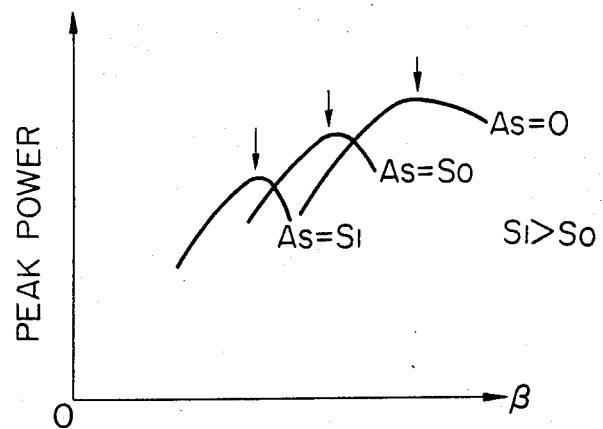
FIG. 6 is a graphical representation showing variations in the peak power.

FIG. 6 is a graphical representation showing variations in the peak power with respect to variations in the magnification $\beta$, provided that the beam projecting angle from the semiconductor laser is constant and the value of As is used as the parameter. As is apparent from this graph, the magnification of the optimum system to be found from the equations (12), (12') and (12") takes the maximum value in these curves. It is also apparent from this graph that as the quantity of As becomes large, the magnification $\beta$ in the optical system shifts to a decreasing direction.

EXAMPLE 1

Assume that an angle, at which the intensity distribution of the orientation characteristic in the semiconductor laser falls on the center peak value of $1/e^2$, is a half angle of 25° in the vertical beam direction ($\theta_{01}$), and 9° in the horizontal beam direction ($\theta_{011}$) and the value of As is 10 $\mu$m.

If As=0 in the vertical beam direction.

$$\beta\perp = 2 \sin 25° \cdot F_2 = 0.85 \cdot F_2$$

If As=10 $\mu$m, and $\lambda$=0.8 $\mu$m in the horizontal beam direction, $$\beta\| = \frac{2 \sin 9° \cdot F}{4\sqrt{1+(\frac{\pi}{\lambda})^2 \sin^4 9 \cdot 10^2}} = 0.27 \cdot F_2$$

Accordingly, the whole system can be constructed with an optical system having different magnification in its vertical direction and horizontal direction.

Figure 7:
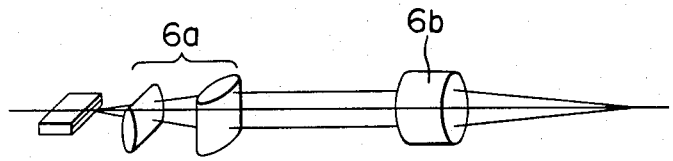
FIG. 7 is one example of the optical layout according to the present invention.

FIG. 7 is a structural diagram of the above-mentioned optical system, wherein, when the focal length of the image forming lens is $f_2$, the focal length of the light collecting lens becomes as follows.

In the vertical direction $$f_1\perp = \frac{f_2}{0.85 F_2}$$

In the horizontal direction:

$$f_1\| = \frac{f_2}{0.27 F_2}$$

In this embodiment, wherein the optical system is constructed by arranging the lenses having such focal lengths, the focal positions are mutually in the vicinity of the light emitting end face of the semiconductor laser.

Figure 8A:
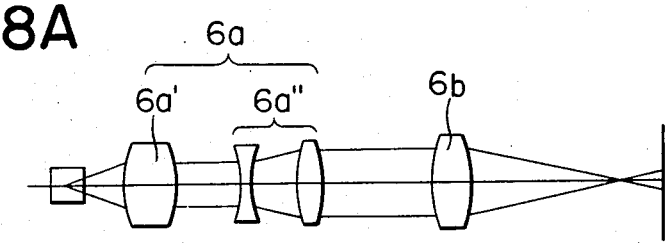
FIGS. 8A and 8B are respectively modified optical layouts of the embodiment shown in FIG. 7.
Figure 8B:
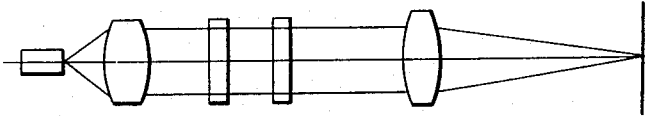

FIGS. 8A and 8B are respectively the top plan view and the side elevational view of another construction of the optical system according to the present invention, wherein the light collecting lens 6a is composed of an object lens 6a' and a cylindrical beam expander 6a". From the foregoing calculation, the afocal magnification $\Gamma$ of the cylindrical beam expander is represented as follows.

$$\Gamma = \frac{0.85}{0.27} = 3.15$$

Also, it goes without saying that the generatrix of the cylindrical beam expander is in parallel with the vertical direction.

Incidentally, the focal length $f_1$ of the object lens and the focal length of the image forming lens are in the following relationship.

$$(f_2/f_1) = 0.27 \cdot F_2$$

Therefore, by selection of any one of $f_1$ and $f_2$, the other can be naturally found out. The value can be arbitrarily determined in accordance with the system to be used.

EXAMPLE 2

$\theta_0\perp = 35°$
$\theta_0" = 12°$
As = 50 $\mu$m
$\lambda = 0.9$ $\mu$m
$\beta\perp = 1.15$ $F_2 = (f_2/f_1)$
$\beta" = 0.14 \cdot F_2$
$\Gamma = 8.2$ In the above equation, if $\beta"$ is calculated on the basis of As=0, there would occur large difference to be represented as follows.

$\beta" 0.42 \cdot F_2$
$\Gamma = 2.74$

That is, in the case of using an optical system which does not carry out the As correction, it is far more advantageous to use an optical system with a magnification corrected in advance, on account of As which the laser per se possesses.

As stated above, the present invention is to provide the optimum optical system for increasing the peak power of the semiconductor laser, the characteristic point of which resides in that the optimum magnification of the semiconductor laser having As which is not corrected by any optical system can be found out by knowing the orientation characteristic and the As value.

In the present specification, the value of $\gamma$ is approximately 2. However, as in the description, this value slightly varies case by case, since only the first term is taken out of the developed terms. According to the exact analyses done by the present inventor, the value of $\gamma$ generally ranges from 1.8 to 2.2 or so. The optimum system according to the present invention may practically adopt the value ranging from 1.2 to 3 without problem.

Next, when the quantity of As is large, the equation (12") is represented as follows, and it does not depend on the orientation characteristic.

$$\beta \approx \frac{\sqrt{2} \, \gamma F_2}{\sqrt{K \cdot As}} \qquad (12''')$$

The range, in which such approximation can be established, is in such a case that the magnitude Wox of the beam waist at the original divergence point of the light source in the horizontal direction and the expansion W'ox (which can be regarded as the expansion due to diffraction of a portion of As from the beam waist) at the light emitting end face are in a relationship of W'ox<<Wox. As an example, when the abovementioned Example 2 is calculated by use of the equation (12'''), the following relationship is established, and both become substantially coincided.

$\beta" \approx 0.15 \cdot F_2$

In other words, when a semiconductor laser of large As is used, the optical system can be easily established only if the quantity of As is made known.

So far, the principle of the present invention has been considered in terms of a coherent system in the TEMoo mode. In general, however, owing to progress in the semiconductor laser technology, the narrow laser in the stripes performs single mode oscillation of the substantial TEMoo mode, which meet the analyses done by the present inventor. However, long laser in the stripes generally performs multimode oscillation, although, in the case of the principal component in this multi-mode being TEMoo mode, a half angle $\theta_{\frac{1}{2}}$ is taken in place of an angle $\theta_0$ of $1/e^2$ in the above equation, and this half angle is multiplied by 1.7 ($\sqrt{\ln 2}/2$) followed by putting this value in the equations (12)-(12''), thereby completing the optimum system. It is lastly mentioned that, even in the case of the multi-mode oscillation, in which the principal component is not in TEMoo mode, it coincides with the optimum system within the range of $\gamma = 1.2 - 3$.

What is claimed is:

1. An image forming optical system using a semiconductor laser comprising:
   (a) a semiconductor laser having different positions for the original divergent point of light beam in the direction of its junction surface and the original divergent point of light beam in the direction perpendicular to the junction surface;
   (b) a scanning surface which receives light beam from said semiconductor laser; and
   (c) an image forming optical system interposed between said semiconductor laser and said scanning surface, and maintaining said original divergent point in the direction perpendicular to the junction surface to said semiconductor laser and said scanning surface in a conjugative relationship, the lateral magnification $\beta$ in the direction perpendicular to said junction surface satisfying the following equation:

$$1.2 \sin\theta_0 \cdot Feff \leq \beta \leq 3 \cdot \sin\theta_0 \, Feff$$

(where $\theta_0$ denotes an angle, at which the intensity of the orientation characteristic of the laser light beam in the direction perpendicular to the junction surface becomes $1/e^2$; and Feff is an effective F-number at the image boundary side of the image forming optical system in the direction perpendicular to said junction surface).

2. The image forming optical system as set forth in claim 1, wherein a horizontal magnification $\beta'$ in the direction parallel to the junction surface of said image forming optical system is represented as follows:

$$\beta' = \frac{\gamma \cdot \sin\theta_0' \cdot F'eff}{4\sqrt{1 + \frac{K^2}{4} \sin^4\theta_0' \cdot As^2}}$$

$$1.2 \leq \gamma \leq 3$$

(where $\theta_0'$ denotes an angle, at which the intensity of the orientation characteristic of the laser light beam in the direction perpendicular to the junction surface becomes $1/e^2$; F'eff is an effective F-numeral at the image boundary side of the image forming optical system in the direction of the junction surface of said semiconductor laser; As represents an interval between the original divergent point of light beam in the direction perpendicular to the junction surface of said semiconductor laser and the original divergent point of light beam in the direction parallel to the junction surface; and $K = 2\pi/\lambda$, in which $\lambda$ is a wavelength.)

3. The image forming optical system as set forth in claim 2, wherein said image forming optical system is divided into a first light collecting optical system and a second light collecting optical system from the side of the light source, and said first light collecting optical system is an anamorphic optical system.

4. The image forming optical system as set forth in claim 3, wherein said first light collecting optical system consists of an object lens composed of a spherical lens and a cylindrical beam expander, the image forming magnification $\Gamma$ of which is substantially in a relationship of $\Gamma = \beta/\beta'$.

* * * * *